United States Patent [19]

Bisceglia

[11] 4,020,335
[45] Apr. 26, 1977

[54] MULTI COLORED LIGHT SIGNAL FOR VEHICLES

[76] Inventor: Peter J. Bisceglia, 1901 McBain Ave., San Jose, Calif. 95125

[22] Filed: July 23, 1975

[21] Appl. No.: 598,373

[52] U.S. Cl. .................... 240/7.1 R; 240/10.66; 340/84; 340/87
[51] Int. Cl.² ................. B60Q 1/00; F21L 11/00
[58] Field of Search .............. 240/7.1 R, 10.66; 340/84, 87, 90, 94, 119

[56] References Cited
UNITED STATES PATENTS

| | | | |
|---|---|---|---|
| 2,252,395 | 8/1941 | Cohen | 340/87 UX |
| 2,375,121 | 5/1945 | McClellan | 340/84 |
| 2,573,926 | 11/1951 | Ogden | 340/94 |
| 2,753,439 | 7/1956 | Greenfield | 240/7.1 R |
| 2,887,563 | 5/1959 | Kiekhaefer | 340/87 X |
| 3,182,742 | 5/1965 | Dow | 240/7.1 R X |
| 3,287,548 | 11/1966 | Kompier | 240/7.1 R |
| 3,473,148 | 10/1969 | Koenig | 340/87 |
| 3,487,360 | 12/1969 | Thompson | 340/87 |
| 3,696,334 | 10/1972 | Demeter | 340/87 X |

*Primary Examiner*—George H. Miller, Jr.
*Attorney, Agent, or Firm*—Leslie M. Hansen

[57] ABSTRACT

A light structure for antenna type mountable on vehicles for visibility from any direction, the light being a direct lineal extension of the antenna mast or shaft consisting of a clear plastic tube wrapped in various colored film along its length and embraced by translucent light diffusing bodies separated by opaque dividers and associated with internal lamps for illuminating each colored zone along its length powered by a suitable source of electrical energy in a switch controlled circuit.

5 Claims, 9 Drawing Figures

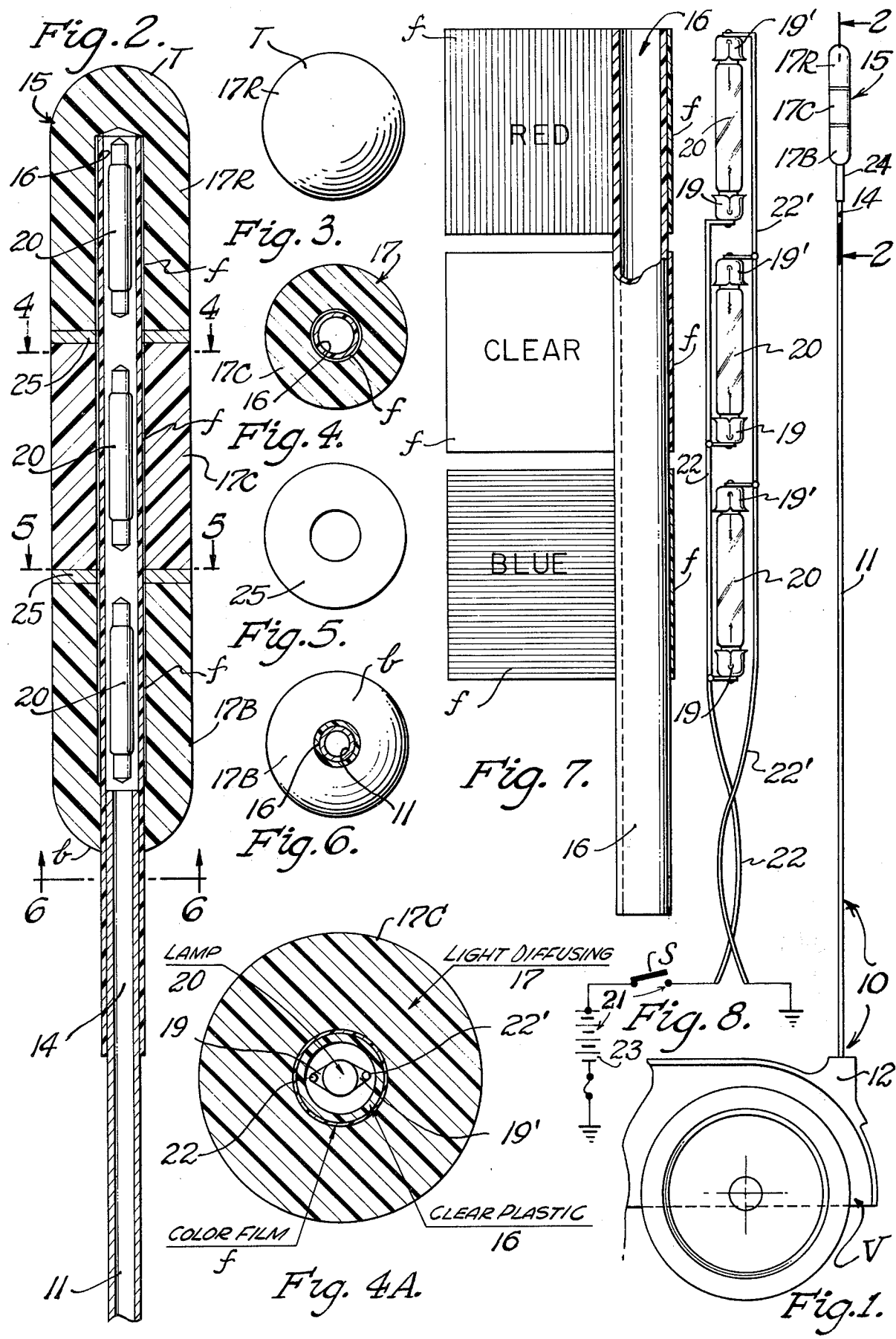

MULTI COLORED LIGHT SIGNAL FOR VEHICLES

This invention relates to light signals and more particularly to multi-colored lights serving as a locator or warning signal on vehicles such as compact cars, motorcycles, bicycles and the like.

BACKGROUND

In the name of safety, there have been many forms of antenna type lights and mountings therefore on vehicles. In general, it has been an object to provide a signal or warning light structured for support upon a vehicle so as to be visible from any angle compasswise about the vehicle.

With the advent of small compact automobiles, the need for such type locators is well known. With such small cars, in a line of traffic the drivers of many cars back are apprised of the presence thereof. This is especially important in the case of motorcycles in night traffic. Such locator lamps are equally applicable and important for use on bicycles in normal night time use in ordinary city and neighborhood traffic.

THE PRESENT INVENTION

The antenna type light of the present invention has its embodiment in the lamp structure to be used on a mast type rod high enough above the vehicle to be seen and recognizable from any and all directions about the vehicle.

It is an object of the present invention to provide on a tubular shaft having one end adapted to be secured to a vehicle, a multi-colored light for the other or top end thereof. In this connection, it is an object to provide such a lamp structured right on the mast type shaft.

It is another object of this invention to provide a staff type lamp structure in which a multiple number of translucent bodies are mounted one above the other on a transparent sleeve housing lamps for illuminating the translucent bodies.

It is a further object to provide opaque separators between the translucent bodies and apply a colored film between the sleeve and each body to illuminate each body in a distinctive color.

It is yet another object to provide sockets and lamps within the sleeve connected in a circuit wired to the vehicle for a source of electrical power and control of the circuit.

These and other objects and advantages of the present invention will become apparent in the following description and claims when read in the light of the accompanying single sheet of drawing in which:

FIG. 1 is a fragmentary side view of a wheeled vehicle having an antenna light signal embodying the present invention mounted thereon;

FIG. 2 is an enlarged section of the light signal only of FIG. 1 and taken along line 2—2 therein;

FIG. 3 is a top plan view of the light signal as seen from above in FIG. 2;

FIG. 4 is a cross-section through the light signal taken along line 4—4 in FIG. 2;

FIG. 4A shows additional details of FIG. 4.

FIG. 5 is a plan view of an opaque divider only which is disposed between segments of the light signal as at line 5—5 in FIG. 2;

FIG. 6 is a bottom plan view of the light signal of FIG. 2 as seen looking upward at line 6—6 therein;

FIG. 7 is an enlarged view of a clear plastic mounting tube of the light partly in section and showing colored sheets associated therewith about to be wrapped around the mounting tube; and FIG. 8 is a schematic diagram of an electrical circuit for the light signal of FIGS. 1 and 2 showing the sockets and the lamps of the light signal.

GENERAL DESCRIPTION

Referring to FIGS. 1 and 2, the antenna type light of the present invention designated 10 comprises a tubular shaft or mast 11 having one end suitably mounted as at 12 on the body of a vehicle V. The manner of mounting the staff 11 on a vehicle is optional and may be of any form sturdy enough to support the mast type staff in a vertical condition with the upper end 14 of the latter carrying the light structure 15 of the present invention thereof. The tubular shaft 11 may be of any well known material strong enough to withstand wind loads and the like without whipping or waving too much relative to the vehicle V.

DETAILED DESCRIPTION OF THE INVENTION

Referring to FIGS. 2 and 7 in the drawing, the light structure 15 in its broadest concept includes a clear plastic tube 16 adapted to be supported upon the upper end 14 of the tubular shaft 11 so as to extend upwardly therefrom. A light diffusing translucent body 17 is slidably mounted on the extended upper end 18 of the clear plastic tube 16. A sheet of thin plastic film -f- is wrapped around the clear plastic tube 16 requiring a press fit between the latter and the translucent body 17 mounted thereon to secure them together. Within the tube 16, a pair of sockets 19-19' are arranged to support an incandescent, clear glass lamp 20. The lamp sockets 19-19' are connected to the positive and negative sides of an electrical circuit 21 having wires 22 and 22' respectively extending through the tube 16 and down the tubular shaft 11 to the vehicle V. Within the vehicle V, a suitable source of electrical energy 23 is connected via a manually controlled switch S to the positive wire 22, the negative wire 22' being grounded to the vehicle and it to the ground side of the source of electrical power 23.

More specifically, the tubular shaft 11 is preferably steel tubing having an inside diameter of approximately ¼ inch to allow passage of the wire 22 and 22' or to provide a ground connection for the negative wire 22' if desired.

The clear plastic tube 16 has the same inside and outside diameter as the tubular shaft 11, the two being joined by at least a four inch long metal tube 24, half of which receives the steel tubular shaft 11 and the other half the clear plastic tube 16 by a secure press fit.

The extended upper end 18 of the clear plastic tube 16 above the joint tube 24 preferably has two or more sheets of separated film -f- wrapped around it in uniform lengths vertically along the length of the tube 16. For purposes of the present invention, FIG. 7 shows each film -f- to be of a different color to distinguish from each other. While the specific colors may vary for the present disclosure, three are shown; one RED, another CLEAR, and the other BLUE. These films f are wrapped tightly around the clear plastic tube and secured thereto.

In keeping with the separation of color in the films f, there are three separate translucent bodies 17 shown, one of a length to cover each color and designated 17R, 17C and 17B respectively in FIG. 2. These translucent bodies are all alike in texture and composition, preferably a clear resin mixed with a transparent pearl dye called "CR-2-DYE". I have found that a formula of eight drops of such dye to each one ounce of resin produces a translucent body simulating visibly a mother of pearl effect. The translucent bodies 17 are molded to an outside diameter about three times that of the clear plastic tube 16 as shown in FIGS. 2 and 4 and has an inside diameter, lengthwise adapted for press fit over the film f wrapped about the tube 16. Each of the translucent bodies 17 are of substantially the length axially of the colored film f it is to cover as shown by the medial body 17C in FIG. 2.

The lowermost translucent body 17B, which is the first one mounted on the tube 16, has a rounded bottom-b- as shown in FIGS. 2 and 6. Its upper end is disposed at the level of the upper edge of the blue colored film f wrapped upon the tube 16. An opaque washer 25 having the same outside diameter as the bodies 17 is mounted on the tube 16 between the separate bodies 17B, 17C, and 17R thereon to keep the colored light from adjacent bodies to blend. The medial body 17C has a similar opaque washer 25 at its upper end and the topmost body 17R being the last mounted on the tube 16 preferably has a closed dome-like terminal end T as shown in FIGS. 2 and 3.

The extended upper end 18 of the clear plastic tube 16 is thus completely covered by the translucent outer bodies 17 of the light 15 of the present invention.

As depicted in FIG. 8, there is a separate lamp 20 for each of the colored zones along the length of the clear plastic tubing 16. Each lamp 20 is provided with a pair of sockets 19 and 19' as previously explained connected to the wires 22 and 22' respectively. These wires 22 and 22' are relatively rigid yet bendable so as to adjust to a position within the clear plastic tube 16 for positioning each lamp 20 in the zone of the colored film f on the outer diameter of the tube 16.

By the foregoing arrangement, when the switch S in the electrical circuit is closed, the lamps 20 are illuminated. This causes each translucent body 17 to glow and to diffuse the light of a color picked up in passage of the light through the film f associated therewith. From FIG. 2, it will be appreciated that a light signal on top of the antenna mast or shaft 11 produces a multicolored light descernable from any direction 360 degrees compasswise about the lamp structure.

For purposes of the present invention, it will be realized that the source of electrical power 23 may be a generator driven by the wheels of a bicycle. It may be a wet cell battery in a motor vehicle, or it may be a dry cell or multiple cells mounted on the vehicle or within the tubular mast of shaft 11.

Having thus described my multi-colored antenna light for vehicles in specific detail, it will be appreciated that it may be susceptible to variations, modifications, and/or alterations without departing from the spirit or scope of the invention therein as called for in the appended claims.

What I claim is:
1. an antenna type light for a vehicle comprising:
   1. a tubular shaft having one end adapted to be secured to a vehicle;
   2. a clear plastic tube mounted on the upper end of said tubular shaft in axial alignment therewith;
   3. incandecent lamp means arranged within said clear plastic tube;
   4. an electrical circuit including a source of electrical energy connected by electrical conductive wires to said incandecent lamp means and controlled by a manually operated switch for illuminating said lamp;
   5. a plurality of light diffusing translucent bodies mounted on and circumscribing said clear plastic tube in tandum relation one upon the other;
   6. a separate thin sheet of colored film wrapped around said clear plastic tube between the latter and each of said translucent bodies for coloring the light emitting from said lamp means for illuminating each of said translucent bodies in a different color; and
   7. opaque means on said clear plastic tube between each of said translucent bodies thereon for preventing blending of the different colors therebetween upon illumination of said lamp means.

2. The antenna type light in accordance with claim 1 in which said light diffusing translucent bodies have the consistancy of a clear resin mixed with a transparent pearl dye for creating a mother of pearl characteristic to the diffusing effect of said translucent bodies.

3. The antenna type light in accordance with claim 2 in which the consistancy of said translucent bodies is formulated by eight drops of CR-2-pearl dye to each ounce of clear resin.

4. The antenna type light in accordance with that of claim 1 in which said incandecent lamps are elongated tubes extending substantially the length of each of said translucent bodies and the colored sheet of thin film associated therewith.

5. The antenna type light in accordance with that of claim 4 in which said electrical circuit includes a negative and a positive socket for each of said incandecent lamps and in which said electrical conductive wires are semirigid affording contact placement of said lamps and sockets in the zone of the respective translucent body and colored film associated therewith.

* * * * *